US012750869B2

(12) United States Patent
Agrawal et al.

(10) Patent No.: US 12,750,869 B2
(45) Date of Patent: Sep. 29, 2026

(54) MULTICAST MESSAGE THAT INCLUDES RESPONSES TO RADIO RESOURCE REQUESTS OF WIRELESS DEVICES OF A MULTICAST GROUP

(71) Applicant: Skylo Technologies, Inc., Mountain View, CA (US)

(72) Inventors: Meghna Agrawal, Cupertino, CA (US); Andrew Nuttall, Mountain View, CA (US); Soham Dhiren Desai, Palo Alto, CA (US); Anteneh Adem, Espoo (FI); Anand Radhakrishnan, Espoo (FI); Yihenew Dagne Beyene, Espoo (FI)

(73) Assignee: Skylo Technologies, Inc., Mountain View, CA (US)

( * ) Notice: Subject to any disclaimer, the term of this patent is extended or adjusted under 35 U.S.C. 154(b) by 304 days.

(21) Appl. No.: 18/609,185

(22) Filed: Mar. 19, 2024

(65) Prior Publication Data

US 2024/0357621 A1 Oct. 24, 2024

Related U.S. Application Data

(60) Provisional application No. 63/536,390, filed on Sep. 2, 2023, provisional application No. 63/460,398, filed on Apr. 19, 2023.

(51) Int. Cl.
*H04W 72/30* (2023.01)
*H04L 5/00* (2006.01)
(Continued)

(52) U.S. Cl.
CPC ........... *H04W 72/30* (2023.01); *H04L 5/0053* (2013.01); *H04W 72/0446* (2013.01); *H04W 84/06* (2013.01)

(58) Field of Classification Search
None
See application file for complete search history.

(56) References Cited

U.S. PATENT DOCUMENTS 7,471,645 B2 12/2008 Torres et al.
8,483,172 B1 * 7/2013 Dinan .................. H04L 5/0025 370/330

(Continued)

FOREIGN PATENT DOCUMENTS

EP 3820056 A1 * 5/2021 ............ H04W 72/23
EP 3707866 B1 * 8/2023 ........... H04L 25/022

(Continued)

OTHER PUBLICATIONS

Univeral Mobile Telecommunications Systems (UMTS) LTE; Multimedia Broadcast/Multicast Service (MBMS) Architecture and functional description (3GPP TS 23.246 version 17.0.0 Release 17, Apr. 2022.

(Continued)

*Primary Examiner* — Melvin H Pollack
(74) *Attorney, Agent, or Firm* — Brian R. Short

(57) ABSTRACT

Apparatuses, methods, and systems of a base station that multicasts a multicast message that includes responses to radio resource requests of wireless devices of a multicast group are disclosed. One method includes receiving, by the wireless satellite base station, a plurality of radio resource requests from a plurality of wireless devices corresponding with preambles received during an access window, forming, by the wireless satellite base station, a multicast group from the plurality of wireless devices based on a timing of receiving the radio resource requests, and a type of response, wherein timing of each radio resource request is based on a timing of the access window utilized by a corresponding preamble, and multicasting, by the wireless satellite base (Continued)

station, a multicast message with a response to the radio resource request to the wireless devices of the multicast group.

20 Claims, 9 Drawing Sheets

(51) Int. Cl.
*H04W 72/0446* (2023.01)
*H04W 84/06* (2009.01)

(56) References Cited

U.S. PATENT DOCUMENTS

| | | | | |
|---|---|---|---|---|
| 9,088,963 | B2 | 7/2015 | Ravishankar et al. | |
| 9,185,623 | B2 * | 11/2015 | Uemura | H04W 36/0007 |
| 10,080,237 | B2 * | 9/2018 | Suzuki | H04W 72/21 |
| 10,433,289 | B2 * | 10/2019 | Morioka | H04W 72/0446 |
| 10,531,433 | B2 * | 1/2020 | Frederiks | H04B 7/0452 |
| 10,567,925 | B2 | 2/2020 | Ly et al. | |
| 10,827,528 | B2 * | 11/2020 | Mukherjee | H04L 5/0048 |
| 10,979,160 | B2 | 4/2021 | Zufall et al. | |
| 10,979,183 | B2 * | 4/2021 | Wang | H04W 52/0219 |
| 11,228,401 | B2 * | 1/2022 | Wang | H04L 1/1864 |
| 11,228,990 | B2 * | 1/2022 | Jeon | H04W 52/50 |
| 11,252,765 | B2 * | 2/2022 | Jeon | H04W 74/004 |
| 11,265,867 | B2 * | 3/2022 | Shiizaki | H04W 72/1268 |
| 11,412,550 | B2 * | 8/2022 | Jeon | H04W 76/11 |
| 11,452,032 | B2 * | 9/2022 | Gupta | H04W 24/08 |
| 11,523,441 | B2 * | 12/2022 | Jeon | H04W 74/0833 |
| 11,558,891 | B2 * | 1/2023 | Jeon | H04W 72/23 |
| 11,641,692 | B2 * | 5/2023 | Jeon | H04L 1/0015 370/329 |
| 11,979,222 | B2 * | 5/2024 | Sedin | H04L 1/1883 |
| 11,985,646 | B2 * | 5/2024 | Lo | H04W 72/20 |
| 11,985,706 | B2 * | 5/2024 | Jeon | H04W 74/0833 |
| 12,207,293 | B2 * | 1/2025 | Gude | H04W 74/0833 |
| 12,225,522 | B2 * | 2/2025 | Yi | H04L 5/0023 |
| 12,225,524 | B2 * | 2/2025 | Xu | H04W 72/23 |
| 12,232,083 | B2 * | 2/2025 | Hui | H04W 72/02 |
| 12,273,925 | B2 * | 4/2025 | Wu | H04W 72/23 |
| 12,289,767 | B2 * | 4/2025 | He | H04W 74/0833 |
| 12,317,278 | B2 * | 5/2025 | Khoshkholgh Dashtaki | H04W 72/23 |
| 12,369,219 | B2 * | 7/2025 | Jeon | H04W 74/0833 |
| 12,382,535 | B2 * | 8/2025 | Kim | H04L 1/1861 |
| 12,389,417 | B2 * | 8/2025 | Yi | H04L 5/0044 |
| 12,395,996 | B2 * | 8/2025 | Yi | H04L 1/08 |
| 12,418,380 | B2 * | 9/2025 | Malladi | H04W 4/40 |
| 12,457,588 | B2 * | 10/2025 | Yi | H04W 72/0446 |
| 12,490,310 | B2 * | 12/2025 | Khoshkholgh Dashtaki | H04W 74/0833 |
| 12,501,426 | B2 * | 12/2025 | Cirik | H04L 1/189 |
| 12,513,626 | B2 * | 12/2025 | Cirik | H04W 52/146 |
| 12,538,297 | B2 * | 1/2026 | Yi | H04B 7/063 |
| 2020/0367275 | A1 * | 11/2020 | Dinan | H04L 5/0055 |
| 2022/0225434 | A1 * | 7/2022 | Kim | H04W 76/30 |
| 2022/0312502 | A1 * | 9/2022 | Kim | H04W 74/0866 |
| 2023/0072763 | A1 * | 3/2023 | Kim | H04W 74/0833 |
| 2023/0092324 | A1 * | 3/2023 | Seidel | H04W 48/18 370/329 |
| 2023/0180301 | A1 * | 6/2023 | Seidel | H04W 74/0833 370/329 |
| 2024/0098704 | A1 * | 3/2024 | Naguib | H04L 1/0075 |

FOREIGN PATENT DOCUMENTS

| | | | | |
|---|---|---|---|---|
| ID | P202202788 A * | 6/2022 | | |
| WO | WO-2022246190 A1 * | 11/2022 | | H04W 72/21 |

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 18), Dec. 2023.

3rd Generation Partnership Project; Technical Specification Group Radio Access Network; Evolved Universal Terrestrial Radio Access (E-UTRA) and Evolved Univesal Terrestrial Radio Access Network (E-UTRAN); Overall description; Stage 2 (Release 18), Dec. 2023.

* cited by examiner

MULTICAST MESSAGE THAT INCLUDES RESPONSES TO RADIO RESOURCE REQUESTS OF WIRELESS DEVICES OF A MULTICAST GROUP

RELATED PATENT APPLICATION

This patent application claims priority to Provisional Patent Application Ser. No. 63/536,390 filed Sep. 2, 2023, and Provisional Patent Application Ser. No. 63/460,398 filed Apr. 19, 2023, which are herein incorporated by reference.

FIELD OF THE DESCRIBED EMBODIMENTS

The described embodiments relate generally to wireless communications. More particularly, the described embodiments relate to systems, methods, and apparatuses for a multicast message that includes responses to radio resource requests of wireless devices of a multicast group.

BACKGROUND

Satellite networks operate to cover large areas and can have a large number of users. Further, only limited amounts of spectral resources are allocated to satellite networks. Accordingly, a satellite network should manage connectivity of wireless devices to the satellite network.

It is desirable to have methods, apparatuses, and systems for a multicast message that includes responses to radio resource requests of wireless devices of a multicast group.

SUMMARY

An embodiment includes a method of a wireless satellite base station. The method includes receiving, by the wireless satellite base station, a plurality of radio resource requests from a plurality of wireless devices corresponding with preambles received during an access window, forming, by the wireless satellite base station, a multicast group from the plurality of wireless devices based on a timing of receiving the radio resource requests, and a type of response, wherein timing of each radio resource request is based on a timing of the access window utilized by a corresponding preamble, and multicasting, by the wireless satellite base station, a multicast message with a response to the radio resource request to the wireless devices of the multicast group.

Another embodiment includes a satellite system base station. For an embodiment, the satellite system base station is configured to receive a plurality of radio resource requests from a plurality of wireless devices corresponding with preambles received during an access window, form a multicast group from the plurality of wireless devices based on a timing of receiving the radio resource requests, and a type of response, wherein timing of each radio resource request is based on a timing of the access window utilized by a corresponding preamble, and multicast a multicast message with a response to the radio resource request to the wireless devices of the multicast group.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for a multicast message that includes responses to radio resource requests of wireless devices of a multicast group.

Figure 1:
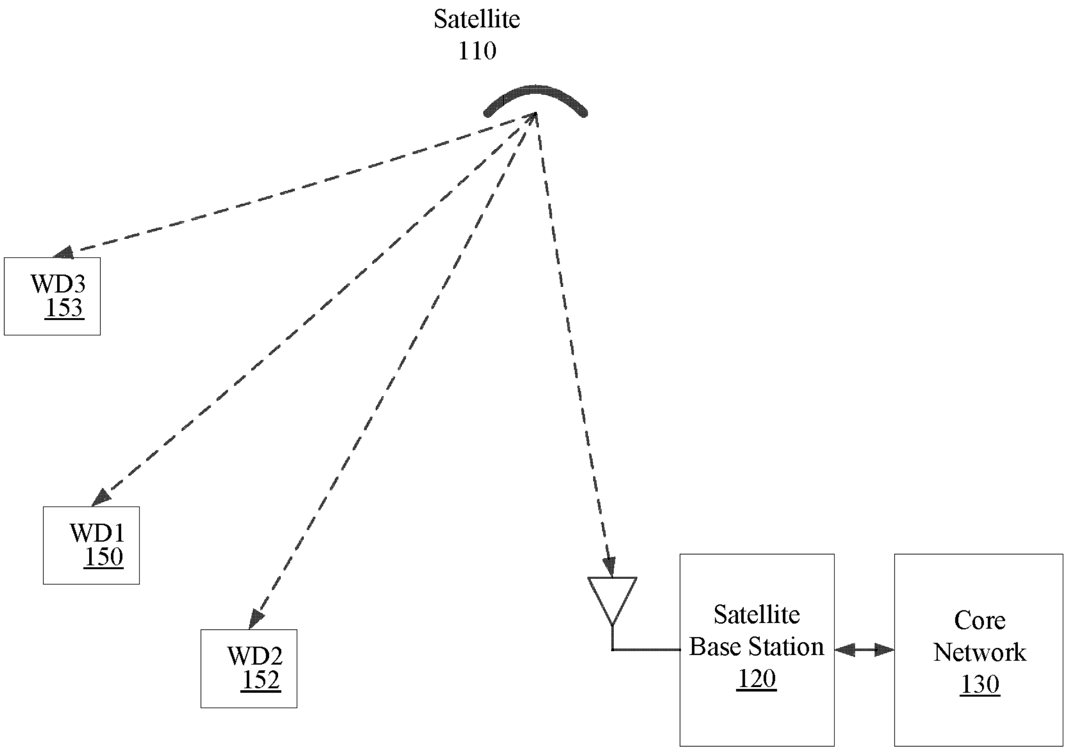
FIG. 1 shows a satellite network that includes a base station that multicasts a multicast message that includes responses to radio resource requests of wireless devices of a multicast group, according to an embodiment.

FIG. 1 shows a satellite network that includes a base station 120 that multicasts a multicast message that includes responses to radio resource requests of wireless devices 150, 152, 153 of a multicast group, according to an embodiment. As shown, a wireless satellite link is formed between the base station 120 and the wireless device 150 through a satellite 110. For an embodiment, a core network 130 is electronically connected to the base station 120. For an embodiment, the core network 130 may also be connected to an upstream application server in which third ($3^{rd}$) party application may be located.

For an embodiment, the base station 120 is configured to receive a plurality of radio resource requests from the plurality of wireless devices 150, 152, 153 corresponding with preambles received during an access window, form a multicast group from the plurality of wireless devices based on a timing of receiving the radio resource requests, and a type of response, wherein the timing includes of each radio resource request a timing of the access window utilized by a corresponding preamble (that is the preamble that the radio resource request from the wireless is associated with, which is identified as the radio resource request from the wireless device that follows the preamble transmitted by the wireless device), and multicast a multicast message with a response to the radio resource request to the wireless devices of the multicast group.

While the described embodiments include a satellite between the base station and the wireless devices. It is to be understood that at least some of the described embodiments may include a direct wireless link between the base station and the wireless devices 150, 152, 153.

Access Windows

For an embodiment, timing of the access windows is communicated to each of the wireless devices by a broadcast message that describes or defines when an access window or access windows occurs. For an embodiment, the access windows occur routinely or periodically, for example, every 600 milliseconds. During an access window if a wireless device has data to transmit to the base station, the wireless device transmits a random-access preamble during the access window.

For an embodiment, the access windows are assigned to specific types of services or classes of service. If a wireless device or a user of the wireless device wants to utilize a certain type of service, then the wireless device utilizes different and coordinated access windows. For an embodiment, additionally within an access window there are multiple "lanes" or preambles which can be used by the wireless device. Some preambles (for example, 1-12 of a possible 48 preambles) may be assigned to some classes or services, while other preambles (for example, 13-48 of the possible 48 preambles) may be assigned to different services.

For an embodiment, preambles are transmitted by the wireless devices, wherein the preambles are received by the base stations during the access windows. For an embodiment, after receiving the preambles the base station transmits a message2 (RAR—random access response as defined by the 3GPP LTE and NB-IoT specification) which includes timing and frequency schedule for radio resource request transmission. For an embodiment, the base station broadcasts the timing of the access windows to the wireless devices, and the wireless devices subsequently transmit the preambles during the scheduled access windows.

For an embodiment, the base station schedules the access windows (also referred to as a preamble access window) and broadcasts the schedule as part of system information broadcast messages. Wireless devices receive the broadcast, and then know when the access windows occur. For an embodiment, the base station dynamically updates (adjusts the timing) of the access windows based on load and traffic conditions of the network that includes the base station. As previously stated, once the wireless devices know when the access windows occur, the wireless devices can then transmit preambles to the base station during the scheduled access windows. The base station then generates the multicast message that can include responses to the wireless devices that transmitted preambles during the access window.

Preambles

For an embodiment, each preamble includes a unique time and frequency hopping scheme that a wireless device transmits during an access window to signal an intention by the wireless device in a pseudo unique way of its desire to transmit data across the network.

Resource Control Requests

A resource control request is an articulated request for radio resources corresponding to a preamble used by a wireless device. For an embodiment, a typical flow includes a wireless device wirelessly communicating a preamble to the base station to indicate intention to transmit during an access window. Next, the base station responds to the wireless device with a RAR (Random Access Response) message to indicate reception of preamble and solicit specific intentions of the device. Next, the wireless device responds to the RAR with a specific request (for an embodiment, a Resource control request). For an embodiment, within the specific request, the wireless device indicates which type of message the wireless device is interested in sending, including if that type of message should include a multicast response or not or if the wireless device wants to send different types of data.

For an embodiment, the radio resource requests include an 'RRC EarlyData requests' as defined by the 3gpp LTE and NB-IoT specification. For an embodiment, the radio resource request includes uplink data or a service request message of the core network along with uplink data, fields which indicate priority of the message, type of the message, whether downlink data (data transmitted by the base station and received by the wireless device) is expected from base station, whether a fast acknowledgement is expected from the base station, and/or whether the wireless device supports receiving a multicast response.

Multicast Group

For an embodiment, the multicast group is explicitly defined as a collection of wireless devices assigned to receive a multicast data associated with a specific multicast identifier (such as, a multicast-Radio Network Temporary Identifier RNTI (a unique identifier)) that have utilized an access window for a preamble transmission during a specific period of time. When a wireless device is included within the multicast group, the multicast message includes a response for the wireless device.

Type of Response

For an embodiment, a response is received from the core network 130 or 3rd party application for the radio resource request. A 'response' indicates the response received by the base station from the core network or a 3rd party application. For an embodiment, the type of response includes whether the core response is a 'service accept message', 'service reject message' or a data transfer message, or whether the response includes a 'fast ack' message from the 3rd party application. For an embodiment, the 3rd party application is an emergency response center.

Forming the Multicast Group for the Plurality of Wireless Devices Based on Timing of Receiving the Radio Resource Request.

For an embodiment, the timing for forming the multicast group includes the time the radio resource request is received by the base station from the wireless device, and a timing of the access window in which the wireless device transmitted the preamble corresponding with the radio resource request. That is, for an embodiment, the base station times the formation of the multicast group based on the timing of the radio resource request and the timing of access window. For an embodiment, the base station forms the multicast group based on the timing and the response received from the core network or a third-party application for the radio resource request. For an embodiment, the access window used by the wireless device to transmit the preamble is within a predefined number of access windows before the formation of the multicast group by the base station. For an embodiment, the predefined number of access windows is adaptively selected to minimize (or reduce) signaling overhead. For an embodiment, the signaling overhead includes the overhead required to establish connection (between the wireless device and the base station) and control channel messages required to facilitate uplink and downlink data communication for a current network traffic load. For an embodiment, the base station has a base station multicast time interval for forming the multicast group. For an embodiment, the base station multicast time interval starts from the first radio resource request received time after the first access window before formation of the multicast group. For an embodiment, the wireless device is included within the multicast group only when the radio access response (that is, the response from the core network or the third-part application to the radio resource request) is received by the base station within the base station multicast time interval. For an embodiment, the base station can further determine whether to include the response (from the core network or the third-party application) of the radio resource request of the wireless device in the multicast packet based on the length of the response or a type of the response, wherein the type of the response includes an acknowledgement response or a data message. For an embodiment, the base station may determine whether to include the response to the radio resource request based on whether continuous communication is required with the wireless device or not. For an embodiment, continuous communication includes a voice communication, a real-time chat session, or video. For an embodiment, the base station may determine whether to include the response to the radio resource request based on a priority or class of service of the response. As described, the base station can further determine whether to include the response (from the core network or the third-party application) of the radio resource request of the wireless device in the multicast packet based on the length of the response. For an embodiment, if the length of the response exceeds a length threshold, then the base station can form multiple multicast groups and multiple multicast messages. For an embodiment, the length threshold can be selected based on a quality of the communication channel between the wireless device and the base station, a selection modulation and coding scheme (MCS), and/or a time required to transmit a message between the wireless device and the base station. That is, the quality of the channel, and the amount of data to be transmitted between the wireless device and the base station can be used to determine the length threshold.

For an embodiment, if the wireless device is not included within the multicast, the base station may transmit a unicast response to the wireless device rather than a multicast message. For an embodiment, the base station may transmit a unicast response if the base station determines that the wireless device does not support reception of a multicast message.

The described embodiments for forming the multicast group and multicast message by the base station provide for more efficient use of radio resources and increased network efficiency. In the absence of the described embodiments for forming the multicast group and the multicast message, the base station may transmit unicast grants and unicast messages to each of the wireless devices which requires more radio resources. Very commonly, the response to the wireless device is only a service accept message without any data. By utilizing the described embodiments for compressing the response to multiple wireless devices from the core network and third-party applications into a multicast message, the base station operates to save (reduce) the use of radio resources.

Multicast Message

For an embodiment, the multicast message is received by all wireless devices with the same data, but some data is destined for some devices and some data for different devices. Each of the wireless devices are able to identify which data is intended for the wireless device.

Figure 2:
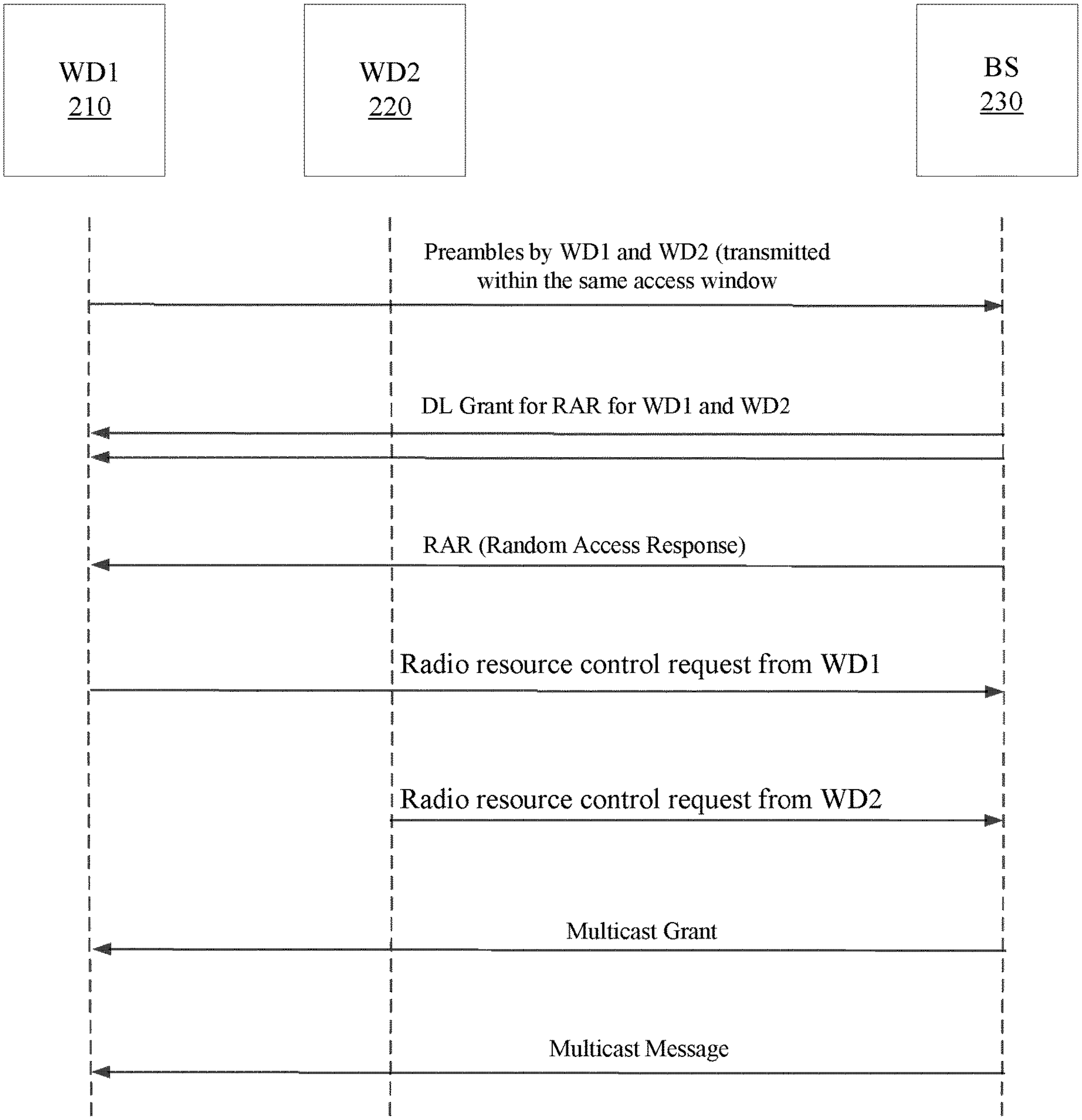
FIG. 2 shows a sequence of interactions between wireless devices and a base station for supporting the multicast message, according to an embodiment.

FIG. 2 shows a sequence of interactions between wireless devices and a base station for supporting the multicast message, according to an embodiment. For an embodiment, the wireless devices (WD1 210, WD2 220) transmit preambles during a scheduled access window. As previously described, for an embodiment, each preamble includes a unique time and frequency hopping scheme that a wireless device transmits during an access window to signal an intention by the wireless device in a pseudo unique way of its desire to transmit data across the network. For an embodiment, the preambles of the wireless devices are transmitted during the same access window, and therefore, are essentially transmitted simultaneously. The preambles are received by a wireless satellite base station 230.

For an embodiment, after receiving the preambles during the access window, the base station responds with a DL (downlink) grant for RAR (radio access resources). Further, the base station responds with a RAR message which serves as an uplink grant for a message, such as, a message3 from the wireless devices. For an embodiment, the DL grant includes frequency and timing of the RAR message which enables the wireless devices to receive the RAR message After receiving the DL grant and the RAR, each of the wireless devices responds with a radio resource request. That is a radio resource request (also referred to as a radio resource control request) from WD1 and a radio resource control request from WD2.

After receiving the radio resource control request from WD1 and the radio resource control request from WD2, the base station 230 responds with a multicast grant and the multicast message. For an embodiment, the multicast grants are used to inform wireless devices when to listen (attempt to receive) for downlink data or when to transmit data to the base station 230. As part of the multicast grouping, all of the wireless devices within the access window time grouping listen for the same singular multicast grant which lets the wireless devices to start attempting to receive the multicast message.

It is to be understood that the 3 GPP specifications teach messages (message1 and message3) being followed up by a unicast message4. However, the described embodiments provide a unique methodology for forming a multicast group to replace the message4 transmission with the transmission of multicast messages to a plurality of wireless devices. That is, the described embodiments include the formation of the multicast group and compression of the responses to the request for radio resources. Further, the described embodiments include the wireless devices receiving and interpreting the multicast messages.

Figure 3:
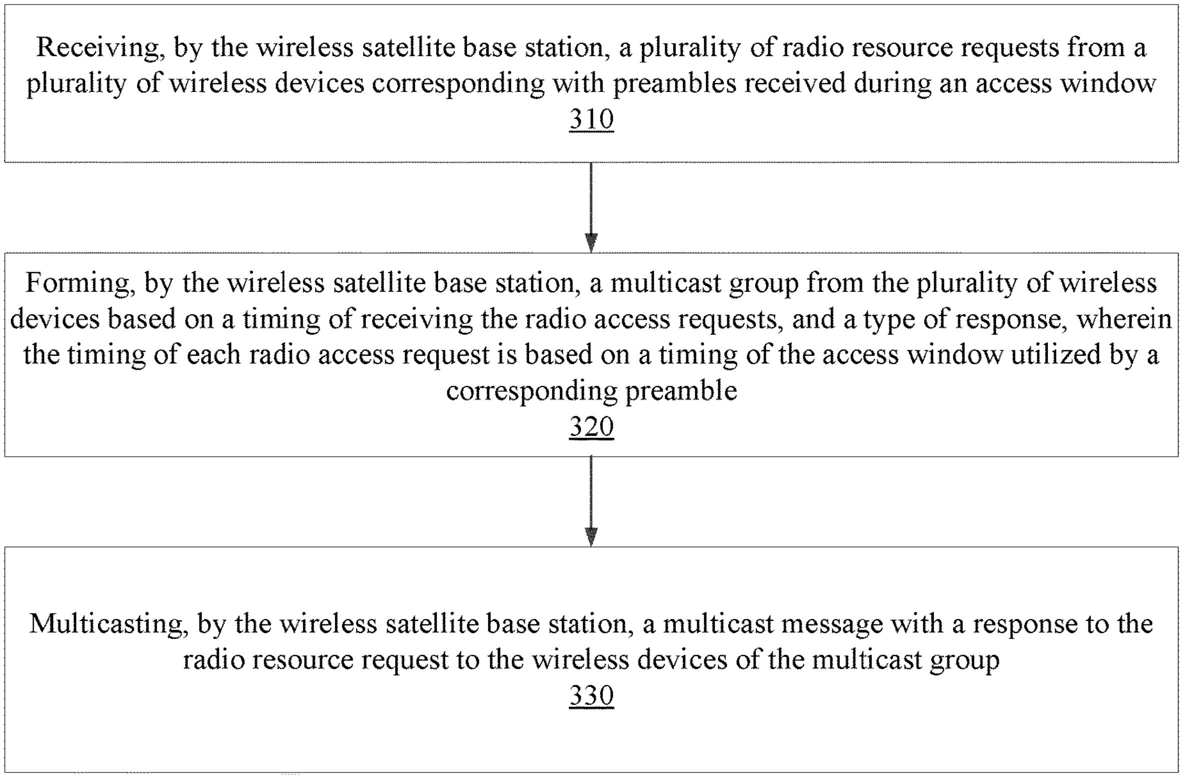
FIG. 3 is a flow chart that includes steps for a base station multicasting a multicast message that includes responses to radio resource requests of wireless devices of a multicast group network, according to an embodiment.

FIG. 3 is a flow chart that includes steps for a base station multicasting a multicast message that includes responses to radio resource requests of wireless devices of a multicast group network, according to an embodiment. A first step 310 includes receiving, by the wireless satellite base station, a plurality of radio resource requests from a plurality of wireless devices corresponding with preambles received during an access window. For an embodiment, the radio resource request (also referred to as a radio resource control request) can also mean radio resource connection request. A second step 320 includes forming, by the wireless satellite base station, a multicast group from the plurality of wireless devices based on a timing of receiving the radio resource requests, and a type of response, wherein the timing includes of each radio resource request a timing of the access window utilized by a corresponding preamble (that is the preamble that the radio resource request from the wireless is associated with, which is identified as the radio resource request from the wireless device that follows the preamble transmitted by the wireless device). The corresponding preamble is the preamble transmitted just before the radio resource request. A third step 320 includes multicasting, by the wireless satellite base station, a multicast message with a response to the radio resource request to the wireless devices of the multicast group.

An embodiment further includes attempting, by each of the wireless devices, reception of a multicast grant for a user period of time after transmitting a preamble. For an embodiment, the user period of time is selected based on a transmission delay associated with the propagation time of the satellite link. For an embodiment, the user period of time includes the propagation time between the wireless device and the base station, plus a base station multicast time interval. The propagation time includes the time it takes a wireless signal to propagate during transmission from the wireless device to the base station. For an embodiment, the user period of time is further based on timing requirements to receive responses from the core network or 3rd party data sources. That is, for an embodiment, after an access window, the multicast message is not sent for another period of time (such as, 5 seconds) to give 3rd party applications time to get their data into the multicast packet. For an embodiment, the base station multicast time interval is the time in which the base station waits for reception of the radio resource request from the wireless device (after receiving the preamble during the access window) and waits for response to the radio resource request from the core network and/or third-party applications and forms the multicast group and the multicast message.

For an embodiment, the attempting, by each of the wireless devices, reception of a multicast grant for the user period of time after transmitting a preamble is initiated an offset after transmitting the preamble, wherein the offset is based on the propagation time between the wireless device and the wireless satellite base station. That is, the offset includes a time delay in which the wireless device waits to initiate the attempt to receive the multicast grant. This allows the wireless device to operate more efficiently.

At least some embodiments further include receiving by the wireless device, multiple multicast grants and multiple multicast messages during the user period of time. That is, for example, if the base station receives 15 radio resource requests then the base station can form one or more multicast messages. Each wireless device then listens (attempts to receive) to all the multicast messages received during the user period of time, even if the message does not include response for this wireless device.

For an embodiment, multiple access windows are mapped to a single multicast grant within the user period of time, wherein a number of the multiple access windows mapped to the single multicast grant is adaptively selected based on a level of network traffic. For an embodiment, the multicast grants are used to inform wireless devices when to listen (attempt to receive) for downlink data or when to transmit data to the base station. As part of the multicast grouping, all of the wireless devices within the access window time grouping listen (attempt to receive) for the same singular multicast grant which lets the wireless devices to start attempting to receive the multicast message. For an embodiment, the multicast grant accounts for buffering of the multicast messages by the core network while collecting the responses from internal or third-party data sources.

For an embodiment, the response includes a collection of responses from a core network and/or third-party applications. For an embodiment, the wireless satellite base station buffers responses received from a core network or received from a third-party application for a base station multicast time interval, wherein the base station multicast time interval is selected based on a class of service of the radio resource request of the response received from the core network or the third-party application. For an embodiment, the base station multicast time interval is selected based on a category of the wireless device. That is, for example, the base station multicast time interval may be reduced if the wireless device is a low-power IoT (internet of things) wireless device. For an embodiment, the base station multicast time interval is selected based on a network load. That is, for example, the base station multicast time interval may be reduced when the network load is low (lower than a network load threshold) and increased when the network load is high (greater than a network load threshold).

For an embodiment, the wireless satellite base station compresses and aggregates the responses to specific messages (such as, a message3) received from the plurality of wireless devices for inclusion in the response of the multicast message. For an embodiment, the compression and aggregation are based on the type of response message. For an embodiment when the response is a service accept message, the base station can omit the response while forming the multicast message.

At least some embodiments further include forming, by the wireless satellite base station, multiple groups of responses and multicasting multiple multicast messages. For an embodiment, the multiple multicast messages are formed based on the size of the response and/or size of the multicast message.

At least some embodiments further include selecting, by the wireless satellite base station, to unicast at least some of the multicast messages to a select set of the plurality of wireless devices. For an embodiment, a unicast message may be selected when the size of the response message received from core or 3rd party application exceeds a threshold. For an embodiment, a unicast message may be selected when the response from core or 3rd party application is received after the BS multicast wait time has passed. For an embodiment, a unicast message may be selected when the wireless device and core network or the third-party application wants to establish a chat session for further back and forth communication.

At least some embodiments further include initiating based on the preambles, buffering of the collection of responses, wherein a content of the response come from multiple sources for multiple wireless devices. That is, a multicast packet may not be formed in an instant. It may take time for the multicast packet to be formed as the content of the packet may come from multiple different sources (such as, different 3rd party sources) for different wireless devices that have all been assigned to the same multicast group.

For an embodiment, the multicast message includes wireless device identifiers that indicate that the multicast message includes a response for wireless devices corresponding with each of the wireless device identifiers. That is, for an embodiment, the multicast message includes wireless device identifiers that indicate to the wireless device that the multicast message includes a response for the identified device. For an embodiment, an order of the identifiers within the multicast message indicates a byte index within the multicast message for the response for this wireless device. For an embodiment, the order of the occurrence of the device identifier within the multicast message defines the location (later in the multicast message) of the response within the multicast message. For an embodiment, the byte index within the multicast message provides a way to indicate the location of the response within the multicast message.

At least some embodiments further include detecting, by the wireless satellite base station, a response received from a core network as a non-access stratum message received from a core network, and compressing or eliminating the response, by the wireless satellite base station in the formed multicast message, if the non-access stratum (NAS) message is detected as a service accept message, and/or the core network indicates that the service accept message can be compressed. For an embodiment, the multicast message when the multicast message includes a compressed NAS response message from the core network, the compression includes elimination of the NAS message based on a type of the NAS message. For example, the NAS message may be eliminated if the NAS message is a service accept message.

For an embodiment, the compressed response includes eliminating the service accept message from the multicast message. For an embodiment, when the service accept is not included in the multicast message, the wireless device utilizes an implicit service accept message. For an embodiment, when the service accept message is not included within the multicast message then RAN layers (radio access network layers, that is, RRC (radio access control), data) of the wireless device stack can inform the NAS (non-access stratum) layer that an implicit service accept message is received. The NAS layer of the wireless device should increment counters and implement other functionalities required to be performed for the service accept message.

As described, for an embodiment, the core network indicates to the base station whether the service accept message can be compressed by the base station. For an embodiment, the base station detects whether the NAS message received from the core network is a service accept message, and based on the content of the message, the base station determines whether to compress the service accept message. For example, if the service accept message does not include optional IEs (information elements) then the base station can transmit an RRCEarlyDataComplete-NB (as defined by the 3GPP specification) message without including the NAS payload. For an embodiment, when a service accept compress flag is enabled, the base station can either compress the multicast message or the base station can transmit an RCEarlyDataComplete-NB message without including the NAS payload.

For an embodiment, the core network maintains a timestamp of last time when the core network sent a configuration to the wireless device. For an embodiment, the configuration includes fields of a service request message as specified, for example, by the 3GPP specification. For example, this may include timer values used by the network, and/or a forbidden TAI (track area information) list. If the configuration has changed since the time that the configuration was sent, then the service accept message is not to be compressed. For an embodiment, the configuration includes an EPS (evolved packet system) bearer context status, forbidden TAIs, and other fields of service accept message.

For an embodiment, if a congestion control is enabled, the core network disables service accept compression to indicate a congestion state to the wireless device.

At least some embodiments further include communicating, by the wireless satellite base station, messages received from the plurality of wireless devices to a core network, and routing, by the core network, the messages received from different of the plurality of wireless devices to different 3rd party applications.

At least some embodiments further include utilizing, by the core network, dedicated signaling protocols to ensure faster acknowledgement of specific (message 3) messages received from the 3rd party application and providing the faster acknowledgements as a response to the base station. For an embodiment, the dedicated signaling protocols are selected for higher class of service wireless devices. For an embodiment, the core network or the base station can have custom APIs or a dedicated data path to receive fast acknowledgements from the services interfacing with the third part application. For an embodiment core and base station can have a dedicated signaling protocol to facilitate faster communication. For an embodiment, this can be done by hosting services/applications on the core network which can preemptively query an endpoint or applications for responses and keep alive messages (heartbeat).

For at least some embodiments, one or more of the plurality of radio resource requests received from the wireless devices include an establishment cause, and further include dividing, by the wireless satellite base station, the plurality of wireless devices into different classes of service, and multicasting, by the wireless satellite base station, multicast messages having a response time dependent on a level of class of service of each of the plurality of wireless devices.

For an embodiment, a RAR message (Message 3 or Early Data Request message) sent by the wireless device includes the establishment cause. For an embodiment, the establishment cause is a field within the radio resource request received from the wireless device which can be used to indicate COS (class of service). Based on the establishment cause, wireless devices are divided into different classes of service for the multicast acknowledgement/response messaging. Similarly, the identification of class of service can also be done by utilizing the access point name (APN) for already existing connections and wireless devices, wherein the APN indicates the destination for the data. If a multicast group contains a wireless device with higher (greater than a threshold) class of service, the expected wait time (the user period of time) for multicast acknowledgment or response is much lower. For an embodiment, the base station can consider the class of service while forming multicast groups. For example, the base station can make a single group for high COS wireless devices and minimize the user period of time for those wireless devices.

Base station also ensures that a faster response from the core or 3rd party application is received when COS level high by utilizing a faster response time by using custom signaling to dedicated end points (to core network and 3rd party application) for faster acknowledgement. In this way, a wireless device which has more urgent requirements or a higher class of service will be able to get the multicast response message faster and the wait time for receiving a multicast message is shorter compared to a multicast group which does not have a high class of service wireless device. At least some embodiments further include compressing and consolidating, by the wireless satellite base station, the multicast message for multiple of the plurality of wireless devices, and multicasting, by the wireless satellite base station, the compressed and consolidated multicast message.

At least some embodiments further include receiving by the wireless device, a request to respond in the multicast message, and responding, by the wireless device, to the satellite base station with an acknowledgement based on the multicast message. For an embodiment, the multicast message could be a Wide Area Emergency Alert like a flood warning. It may be useful to know what wireless devices received the Wide Area Emergency Alert multicast message. Accordingly, for an embodiment, the multicast message contains a request to "check-in", in which a wireless device would then transmit back to the network that the wireless device had received the multicast packet.

Figure 4:
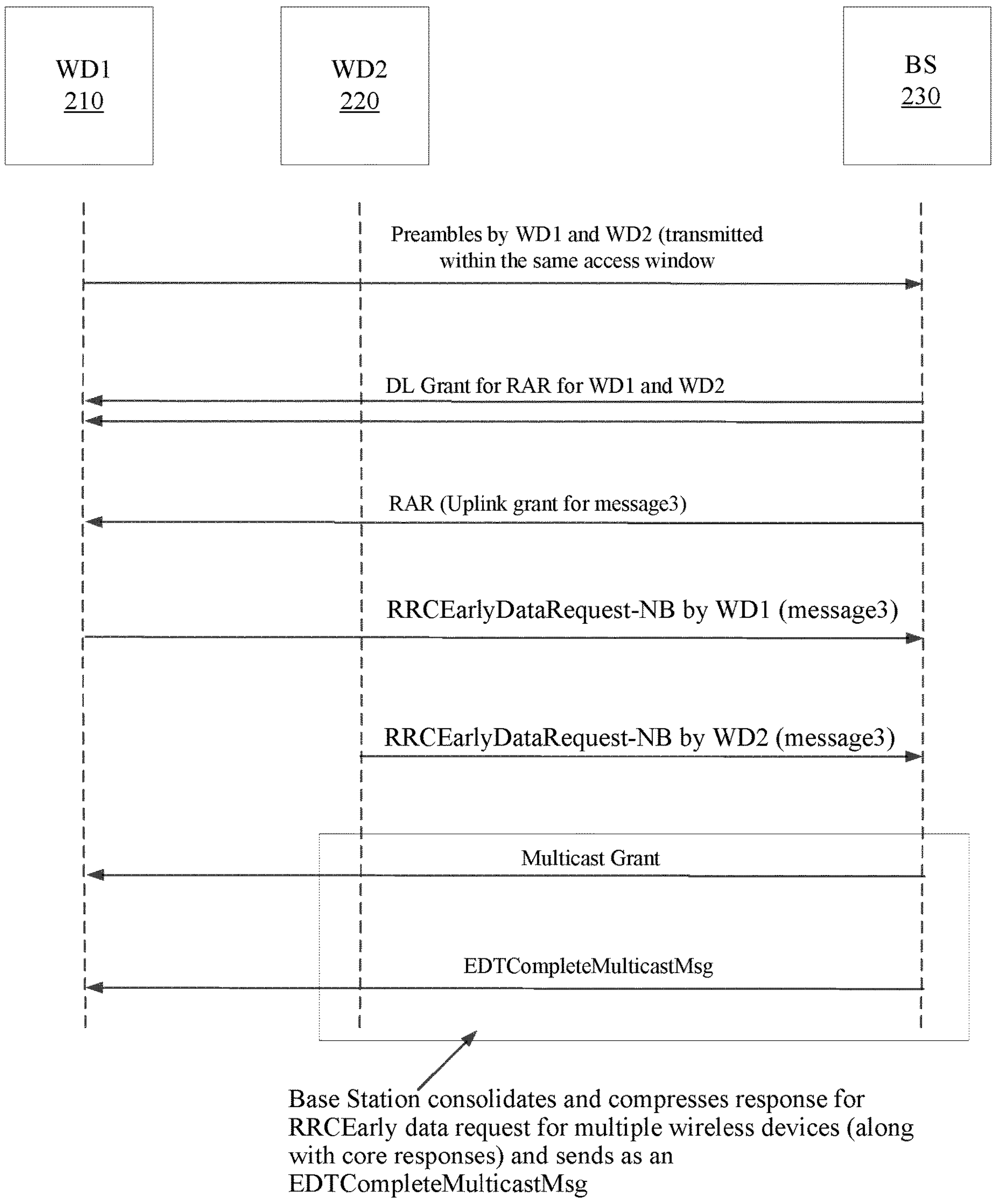
FIG. 4 shows a more detailed sequence of interactions between wireless devices and a base station for supporting the multicast message, according to an embodiment.

FIG. 4 shows a more detailed sequence of interactions between wireless devices and a base station for supporting the multicast message, according to an embodiment. As shown, the radio resource requests are implemented with RRCEarlyDataRequest-NB which are radio resource requests as defined by the 3gpp LTE and NB-IoT specification. Further, the multicast response is implemented with an EDTCompleteMulticastMessage which is a multicast message as defined by the 3gpp LTE and NB-IoT specification. As shown in FIG. 4, for an embodiment, the EDTCompleteMulticastMessage is generated by the base station consolidating and compressing responses for the RRCEarlyDataRequest for multiple wireless devices along with the responses from the core network and third-party applications.

Figure 5:
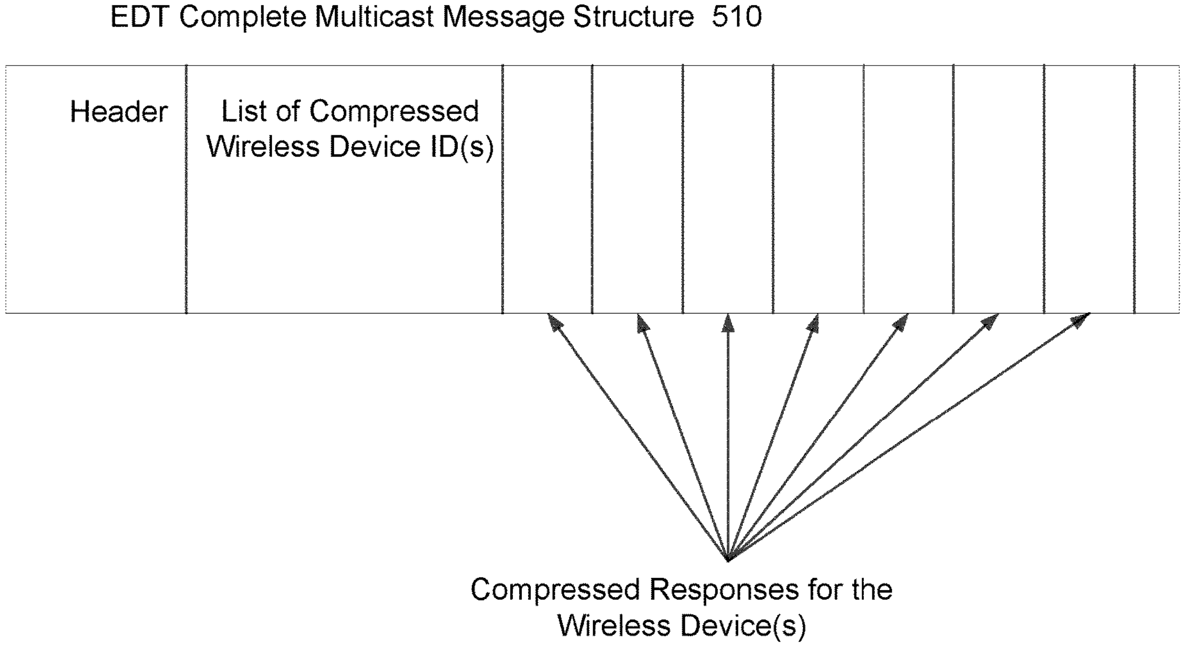
FIG. 5 shows the structure of a multicast message, according to an embodiment.

FIG. 5 shows a structure of a multicast message, according to an embodiment. As shown, for an embodiment, the multicast message 510 includes at least a header, a list compressed wireless device ID(s) and compressed responses for the wireless devices. The wireless device receives the multicast message 510 and determines whether the multicast message 510 includes an ID for the wireless device. For an embodiment, when the wireless device identifies an ID corresponding with the wireless device, the wireless device then determines whether there is a compressed response for the wireless device. If there is a response, then the wireless device decodes the response. If there is not a response for the wireless device and an ID for the wireless devices has been identified within the multicast packet, then the wireless device interprets the identification of the ID as an implicit acknowledgement of the radio resource request of the wireless device. If the wireless device is not able to identify the ID corresponding with the wireless device, then no implicit acknowledgement is determined, and the wireless device must retransmit the request for radio resources.

For an embodiment, the wireless device continues to wait until the end of the user period of time for reception of the multicast message or a unicast message. For an embodiment, if a response (the multicast message or the unicast message) is not received by the end or the user period of time, for an embodiment, the wireless device assumes that the radio resource request didn't reach base station, and the wireless device then retransmits the radio resource request. For an embodiment, when the base station forms multicast message, the response for wireless devices which have a response with NAS payload can be placed first in the sequence of responses. For an embodiment, when base station forms the multicast message, the base station places one common RRC message at the end of the multicast message for the wireless devices which don't have a dedicated response in the multicast message. For an embodiment, if the wireless device receives a multicast message without NAS payload, the wireless devices assumes the response from the core network is a service accept message.

Figure 6:
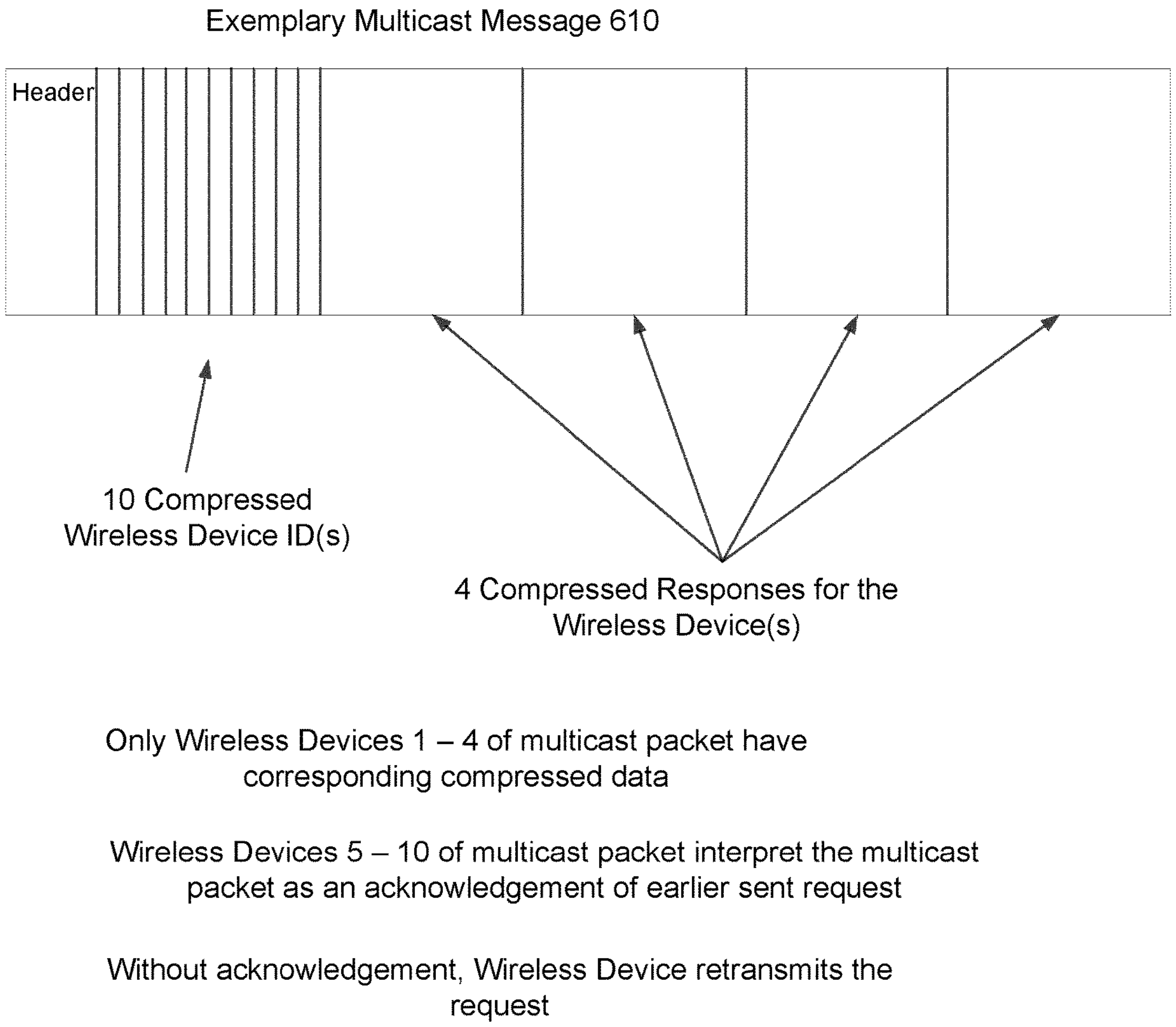
FIG. 6 shows a multicast message that includes identifiers for wireless devices and responses for a subset of the wireless devices, according to an embodiment.

FIG. 6 shows a multicast message 610 that includes identifiers for wireless devices and responses for a subset of the wireless devices, according to an embodiment. For this exemplary embodiment, 10 compressed wireless devices identifiers are included within the multicast packet. Wireless devices receive the multicast packet. Of the wireless devices that receive the multicast packet, the 10 identified by the compressed wireless ID(s) further decode the multicast packet 610 to determine if the multicast packet includes responses for a previously transmitted radio resource request of the wireless device. If the response is identified, then the wireless device decodes and utilizes the data of the response. If a response is not identified, then the receiving wireless device identifies the inclusion of the ID of the wireless device as an implicit acknowledgement of the request. For the multicast packet 610 of FIG. 6, compresses ID(s) for wireless devices 1-10 are included. Further, responses for wireless devices 1-4 are included within the multicast packet. Therefore, wireless devices 1-4 decode the corresponding responses, and devices 5-10 determine the inclusion of the wireless device ID(s) as an implicit acknowledgement of the radio resource request of devices 5-10. Other devices identify that they can retransmit their radio resource requests as no acknowledgement is determined.

Figure 7:
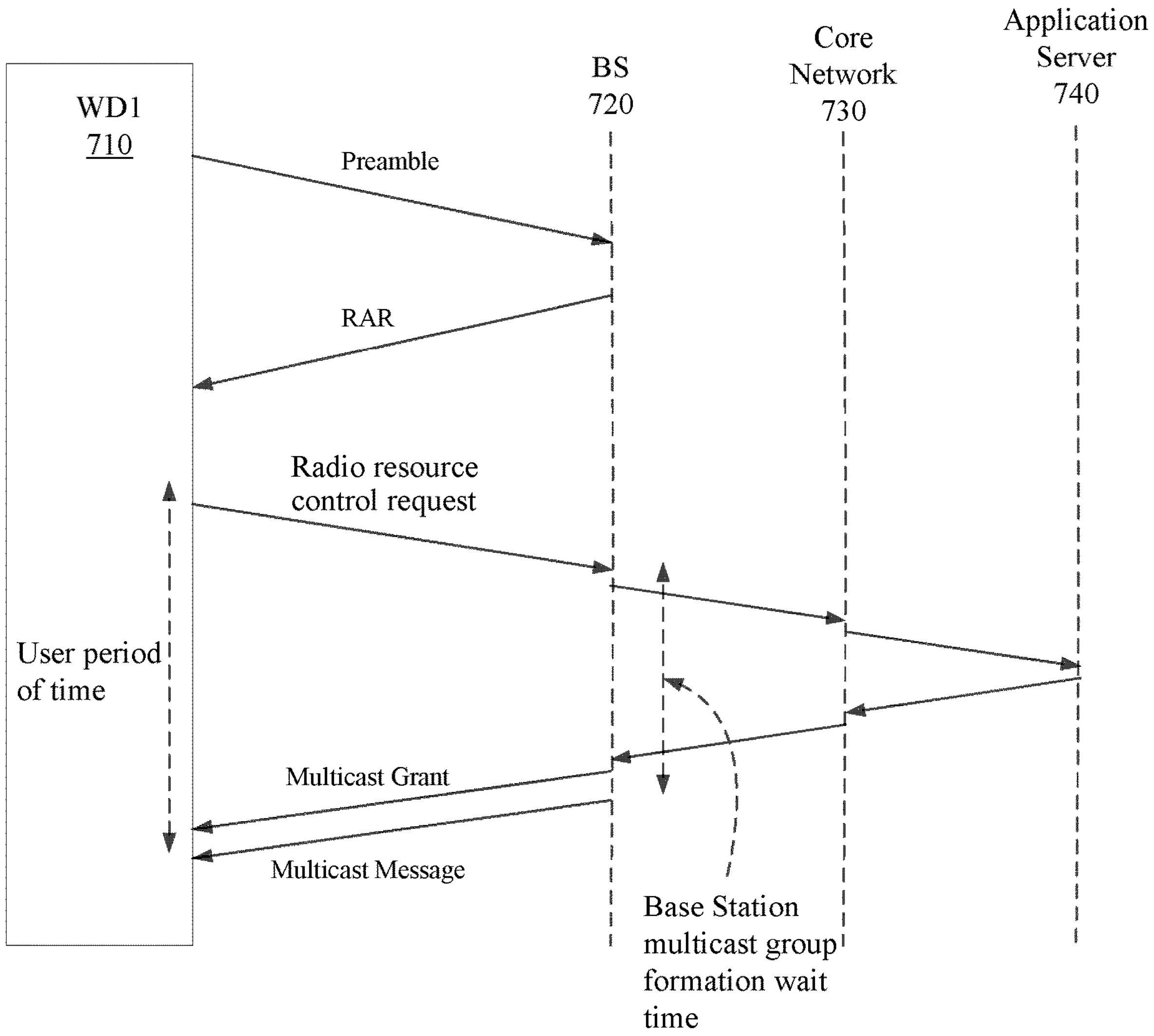
FIG. 7 shows interactions between a wireless device and a base station and shows wait times of the wireless device and the base station, according to an embodiment.

FIG. 7 shows interactions between a wireless device 710 and a base station 720 and shows wait times of the wireless device 710 and the base station 720, according to an embodiment. The wait time of the wireless device 710 is the previously described user period of time, and the wait time of the base station 720 is the previously described base station multicast time interval. As shown, the user period of time includes timing between transmission of the radio resource request by the wireless device, and reception of the multicast message from the wireless devices is expected. As previously described, an embodiment includes attempting, by each of the wireless devices, reception of a multicast grant for the user period of time after transmitting a preamble. The attempting to receive stops after the user period of time, and the wireless device can then retransmit the radio resource request.

Further, as shown, for an embodiment, the base station multicast time interval includes the time required for the request to propagate from the base station 720, to the core network 730, to an application server 740, and a response to propagate from the application server 740, to the core network 730, and then back to the base station 720.

As previously described for an embodiment, the base station has the base station multicast time interval for forming the multicast group. For an embodiment, the base station multicast time interval starts from the first radio resource request receive time after the first access window before formation of the multicast group. For an embodiment, the wireless device is included within the multicast group only when the radio access response (that is, the response from the core network or the third-part application to the radio resource request) is received by the base station within the base station multicast time interval.

Figure 8:
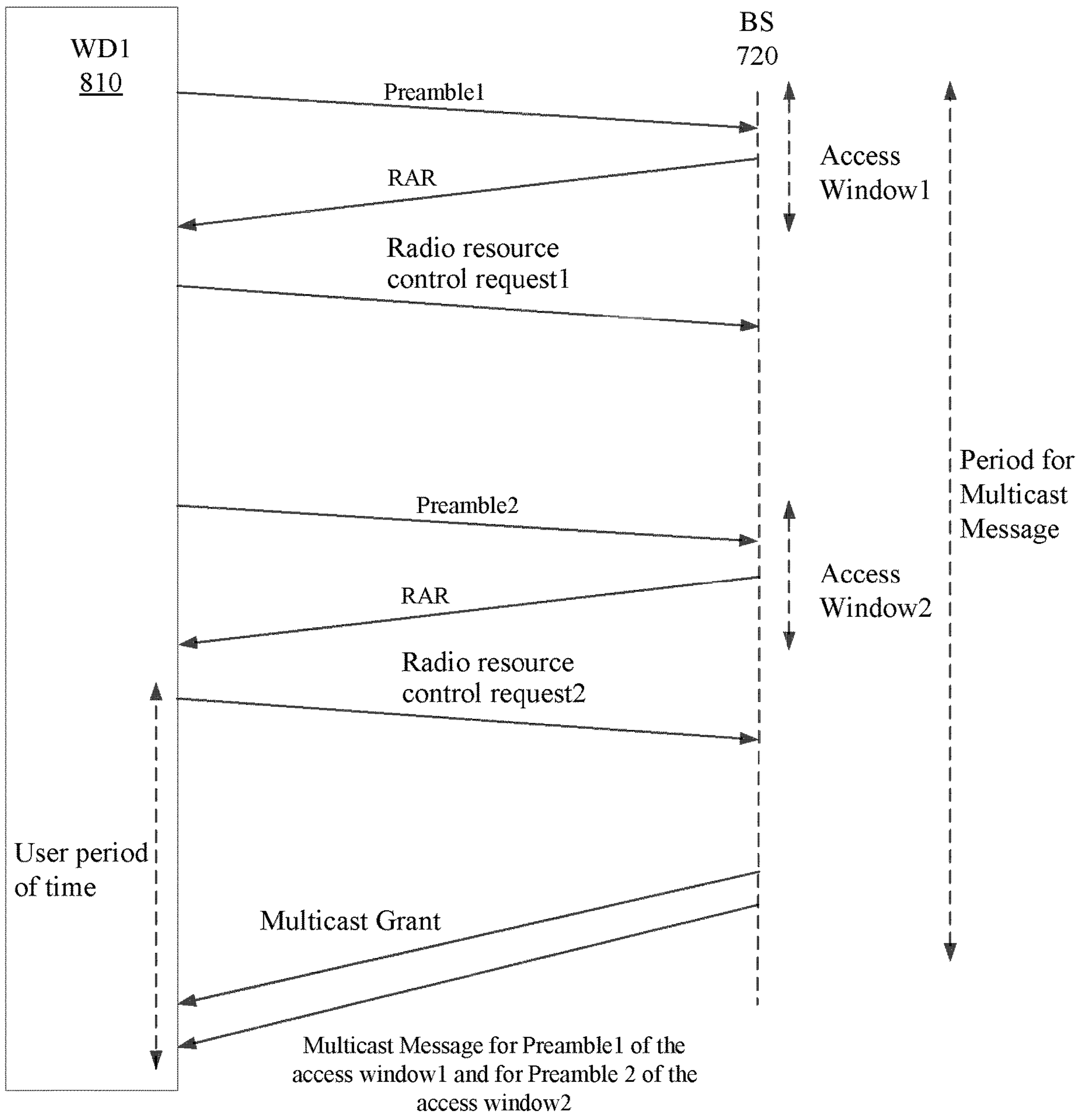
FIG. 8 shows interactions between a wireless device and a base station, and shows a multicast message for multiple access windows, according to an embodiment.

FIG. 8 shows interactions between a wireless device 810 and a base station 720 and shows a multicast message for multiple access windows (access window1 and access window2), according to an embodiment. This exemplifies that a single multicast message may include responses for multiple radio resource requests.

As previously described, each of the wireless devices (such as the wireless device 810) attempts reception of a multicast message for the user period of time after transmitting a radio resource request. As shown in FIG. 8, the wireless device 810 attempts reception of the multicast message after the last radio resource request (Radio resource control request2) Further, as described, for an embodiment, multiple access windows (Access Window1, Access Window2) are mapped to a single multicast grant (multicast message shown in FIG. 8) within the user period of time. For an embodiment, a number of the multiple access windows mapped to the single multicast grant is adaptively selected based on a level of network traffic and/or COS requirement.

Figure 9:
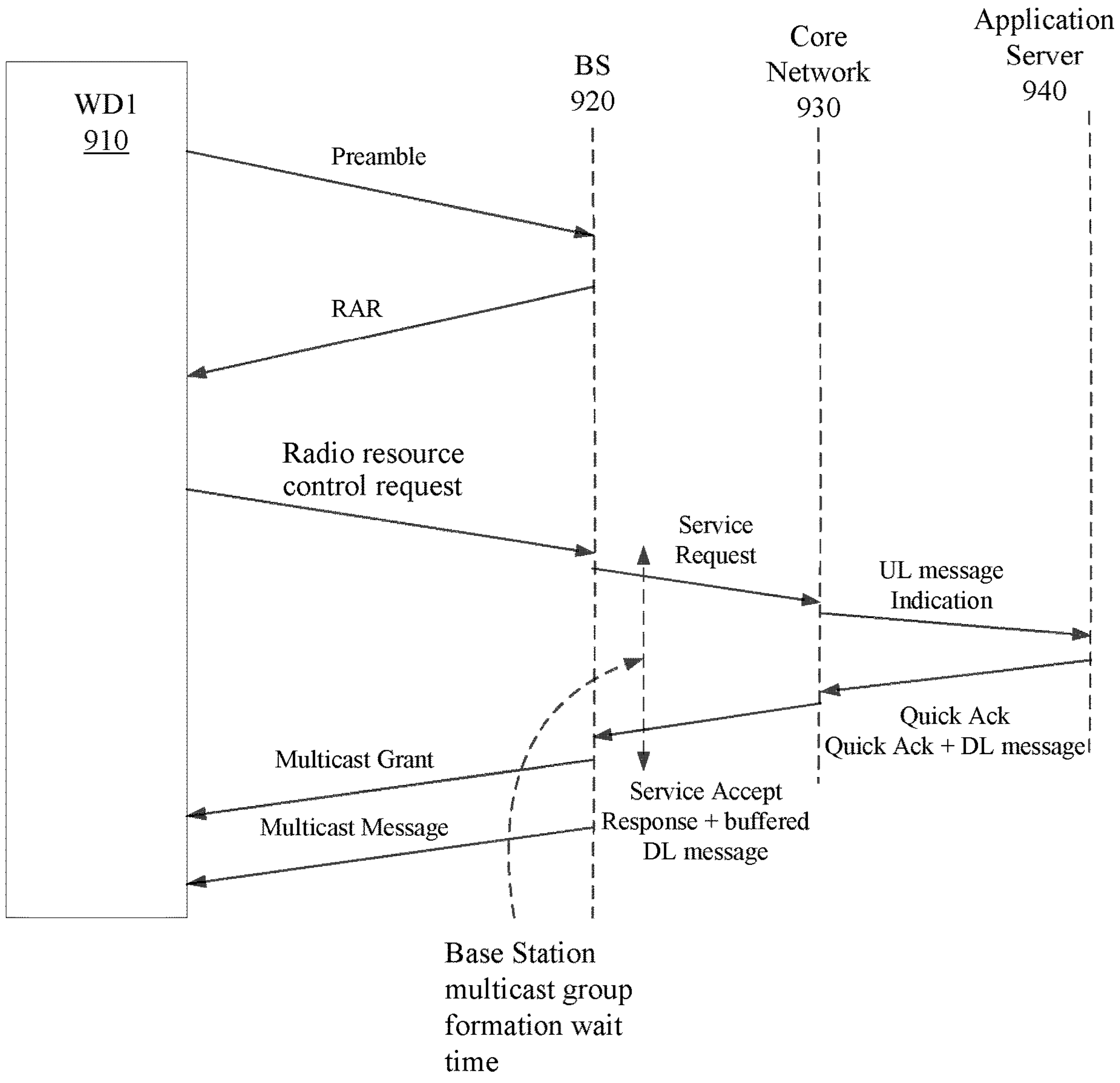
FIG. 9 shows interactions between a wireless device and a base station that includes a quick-acknowledgement and a service accept, according to an embodiment.

FIG. 9 shows interactions between a wireless device 910 and a base station 920 that includes a quick-acknowledgement and a service accept, according to an embodiment. For an embodiment, the base station sends the service request message received from the wireless device to the core network 930. For an embodiment, the base station 920 also indicates whether a faster acknowledgment is required for the multicast message. For an embodiment, if a faster response is required then core network 930 can use a dedicated signaling protocol to provide the UL message indication to a 3rd part application of an application server 940 and receive a faster acknowledgement from the 3rd party application. For an embodiment, 3rd party application can also provide buffer DL packets for the wireless device along with the quick acknowledgement. For an embodiment, if the service request is accepted by the core network 930, core network 930 sends the service accept msg along with the buffered DL packet to the base station 920.

For an embodiment, base station has a direct signaling protocol between the base station and 3rd party application to obtain the quick acknowledgement and response from the 3rd party application of the application server 940. For an embodiment, the 3rd party application includes an application service which is connected to core network 930 and user service providers, such as, emergency service providers.

Although specific embodiments have been described and illustrated, the embodiments are not to be limited to the specific forms or arrangements of parts so described and illustrated. The described embodiments are to only be limited by the claims.

What is claimed:

1. A method of a wireless satellite base station, comprising:

receiving, by the wireless satellite base station, a plurality of radio resource requests from a plurality of wireless devices corresponding with preambles received during an access window;

forming, by the wireless satellite base station, a multicast group from the plurality of wireless devices based on a timing of receiving the radio resource requests, and a type of response, wherein timing of each radio resource request is based on a timing of the access window utilized by a corresponding preamble, wherein the multicast group is defined as a collection of wireless devices assigned to receive a multicast data associated with a specific multicast identifier; and downlink multicasting, by the wireless satellite base station, a multicast message with a response to the plurality of radio resource requests to the wireless devices of the multicast group.

2. The method of claim 1, further comprising:

attempting, by each of the wireless devices, reception of a multicast grant for a user period of time after transmitting a preamble.

3. The method of claim 2, wherein multiple access windows are mapped to a single multicast grant within the user period of time, wherein a number of the multiple access windows mapped to the single multicast grant is adaptively selected based on a level of network traffic.

4. The method of claim 1, further comprising:

collecting, by the wireless satellite base station, responses for each of the plurality of wireless devices;

wherein the responses include a collection of responses from a core network or a third party application.

5. The method of claim 4, further comprising initiating based on the preambles, buffering of the collection of responses, wherein a content of the response come from multiple sources for multiple wireless devices.

6. The method of claim 1, wherein the multicast message includes wireless device identifiers that indicate that the multicast message includes a response for wireless devices corresponding with the wireless device identifiers.

7. The method of claim 1, further comprising:

detecting, by the wireless satellite base station, a response received from a core network as a non-access stratum message received from a core network;

compressing or eliminating the response received from the core network, by the wireless satellite base station, in the formed multicast message if the non-access stratum message is detected as a service accept message.

8. The method of claim 1, further comprising:

communicating, by the wireless satellite base station, messages received from the plurality of wireless devices to a core network; and routing, by the core network, the messages received from different of the plurality of wireless devices to different 3rd party applications.

9. The method of claim 8, further comprising:

utilizing, by the core network, dedicated signaling protocols to ensure faster acknowledgement of specific messages received from the 3rd party application and providing the faster acknowledgements as a response to the base station.

10. The method of claim 1, wherein one or more of the plurality of radio resource requests received from the wireless devices include an establishment cause, and further comprising:

dividing, by the wireless satellite base station, the plurality of wireless devices into different classes of service; and multicasting, by the wireless satellite base station, multicast messages having a response time dependent on a level of class of service of each of the plurality of wireless devices.

11. The method of claim 1, further comprising:

compressing and consolidating, by the wireless satellite base station, the multicast message for multiple of the plurality of wireless devices;

multicasting, by the wireless satellite base station, the compressed and consolidated multicast message.

12. The method of claim 1, further comprising;

receiving by the wireless device, a request to respond in the multicast message; and responding, by the wireless device, to the satellite base station with an acknowledgement based on the multicast message.

13. A satellite system base station, configured to:

receive a plurality of radio resource requests from a plurality of wireless devices corresponding with preambles received during an access window;

form a multicast group from the plurality of wireless devices based on a timing of receiving the radio resource requests, and a type of response, wherein timing of each radio resource request is based on a timing of the access window utilized by a corresponding preamble, wherein the multicast group is defined as a collection of wireless devices assigned to receive a multicast data associated with a specific multicast identifier; and downlink multicast a multicast message with a response to the radio resource requests to the plurality of wireless devices of the multicast group.

14. The satellite system base station of claim 13, wherein the wireless devices are each configured to:

attempt reception of a multicast grant for a user period of time after transmitting a preamble.

15. The satellite system base station of claim 14, wherein multiple access windows are mapped to a single multicast grant within the user period of time, wherein a number of the multiple access windows mapped to the single multicast grant is adaptively selected based on a level of network traffic.

16. The satellite system base station of claim 13, wherein the base station is further configured to:

collect responses for each of the plurality of wireless devices;

wherein the responses include a collection of responses from a core network or a third party application.

17. The satellite system base station of claim 13, wherein the multicast message includes wireless device identifiers that indicate that the multicast message includes a response for wireless devices corresponding with each of the wireless device identifiers.

18. The satellite system base station of claim 13, wherein the base station is further configured to:

detect a response received from a core network as a non-access stratum message received from a core network;

compress or eliminate the response received from the core network, by the wireless satellite base station, in the formed multicast message if the non-access stratum message is detected as a service accept message.

19. The satellite system base station of claim 13, wherein the base station is further configured to:

communicate messages received from the plurality of wireless devices to a core network; and route the messages received from different of the plurality of wireless devices to different 3rd party applications.

20. The satellite system base station of claim 19, wherein the core network is configured to:

utilize dedicated signaling protocols to ensure faster acknowledgement of specific (message 3) messages received from the 3rd party application and providing the faster acknowledgements as a response to the base station.

* * * * *